(12) United States Patent
De Gaillard et al.

(10) Patent No.: US 6,604,782 B2
(45) Date of Patent: Aug. 12, 2003

(54) OPENABLE MOTOR VEHICLE ROOF

(75) Inventors: Francois De Gaillard, Mouilleron en pards (FR); Wolfgang Seifert, Germering (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/136,448

(22) Filed: May 2, 2002

(65) Prior Publication Data

US 2003/0006631 A1 Jan. 9, 2003

(30) Foreign Application Priority Data

May 2, 2001 (DE) .......................................... 101 21 431

(51) Int. Cl.⁷ ................................................ B60J 25/07
(52) U.S. Cl. ............................ 296/216.04; 296/216.01; 296/220.01; 296/222; 296/223; 296/106; 296/146.8
(58) Field of Search ....................... 296/76, 106, 146.2, 296/146.8, 146.16, 216.01, 216.04, 220.01, 222, 223

(56) References Cited

U.S. PATENT DOCUMENTS

| 2,782,070 | A |   | 2/1957  | Chaban  |          |
|-----------|---|---|---------|---------|----------|
| 4,272,121 | A | * | 6/1981  | Kim     | 296/216.04 |
| 4,630,858 | A | * | 12/1986 | Bez     | 296/216.04 |
| 4,801,174 | A | * | 1/1989  | Hirshberg et al. | 296/216.04 |
| 5,031,949 | A |   | 7/1991  | Sorimachi et al. |        |
| 5,803,534 | A | * | 9/1998  | Murkett et al. | 296/222 |
| 6,460,921 | B2 | * | 10/2002 | DeGaillard | 296/220.01 |
| 6,485,094 | B2 | * | 11/2002 | Corder et al. | 296/220.01 |

FOREIGN PATENT DOCUMENTS

| DE | 40 26 120     |   | 2/1991  |
|----|---------------|---|---------|
| EP | 0 101 322 A2  |   | 2/1984  |
| EP | 0101322 A     | * | 2/1984  |
| EP | 0 989 008 A2  |   | 3/2000  |
| EP | 0 989 009     |   | 3/2000  |
| EP | 0 989 009 A1  |   | 3/2000  |
| GB | 2 188 595     |   | 10/1987 |

* cited by examiner

Primary Examiner—D. Glenn Dayoan
Assistant Examiner—Lori L Coletta
(74) Attorney, Agent, or Firm—Nixon Peabody LLP; David S. Safran

(57) ABSTRACT

A openable motor vehicle roof with at least one cover (10, 12) which can be moved out of a closed position in which it closes a roof opening along a roof guideway (14) to the rear into a deposited position in a rear gate (16) of the motor vehicle. The rear gate is provided with a guideway (22) for the at least one cover and is coupled to the vehicle body to swing about a transverse pivot axis that is located on or near its upper end in order to be swung out of the closed position into an open position. The guideways (14, 22) and the rear gate (16) are made such that the transfer of the at least one cover to the rear gate takes place in a transfer position of the rear gate which lies between the closed position and the open position of the rear gate (16).

16 Claims, 11 Drawing Sheets

OPENABLE MOTOR VEHICLE ROOF

BACKGROUND OF THE INVENTION

1. Field of the Invention

This invention relates to an openable motor vehicle roof with at least one cover which can be moved out of a closed position in which it closes a roof opening, along a roof guideway to the rear into a deposited position in the rear gate of the motor vehicle, the rear gate having a guideway for the at least one cover and being coupled to the vehicle body so as to pivot around an axis which runs in the transverse direction of the motor vehicle so that it can be swung between open and closed positions

2. Description of Related Art

Published European Patent Application EP 0 989 009 A1 discloses a motor vehicle roof in which there are several covers which lie one behind another, in the manner of louvers, in the closed position and which can be pushed in a roof-mounted guide rail into a cover cassette which is located on the back end of the roof, and in which the louvers art located on top of one another. After lowering the back window into the rear gate, it is possible, with the rear gate closed, to push the cover cassette with the covers located in it into the lower area of the rear gate along guide rails which are provided laterally in the rear gate.

Published European Patent Application EP 0 989 008 A2 discloses a motor vehicle roof in which there are several covers which lie behind one another in the manner of louvers in the closed position and which can be moved by means of a vehicle-mounted guide rail to the rear down into a rear door which can be opened around an essentially vertically running pivot axis with the covers located in it.

The disadvantage in these known motor vehicle roofs is that, especially in a vertical or steeply angled rear gate, the transfer of the covers to the rear gate is mechanically problematical and therefore major limitations arise in the configuration of the displacement mechanism and the cover size.

SUMMARY OF THE INVENTION

The object of this invention is to devise an openable motor vehicle roof which allows even large covers to be deposited in a space-saving manner and still enables a configuration of the cover mechanism that is as simple as possible.

This object is achieved in accordance with the invention by a motor vehicle roof in which the guideways for the cover(s) and the rear gate are made such that the transfer of the cover(s) to the rear gate takes place in a transfer position of the rear gate which lies between the closed position and the open position of the rear gate. In this approach according to the invention, it is advantageous for even large covers, especially glass covers, to be easily deposited, especially with a simple configuration of the cover mechanism, such that neither the appearance of the motor vehicle is adversely affected nor the size of the stowage space diminished.

In one simple configuration, the guideway of the rear gate is stationary with respect to the rear gate. In this case, a gap which exists in the transfer position of the rear gate between the ends of the guideway of the rear gate and the roof guideway can be bridged by a carriage guided in the roof guideway or in the rear gate, with brackets.

Alternatively, if the guideway of the rear gate is formed to be movable with respect to the rear gate in the lengthwise direction of the guideway, the guideway in the transfer position of the rear gate can adjoin the back end of the roof guideway at its upper end.

Preferred embodiments of the invention is explained in detail with reference to the accompanying drawings.

DETAILED DESCRIPTION OF THE INVENTION

Figure 1:
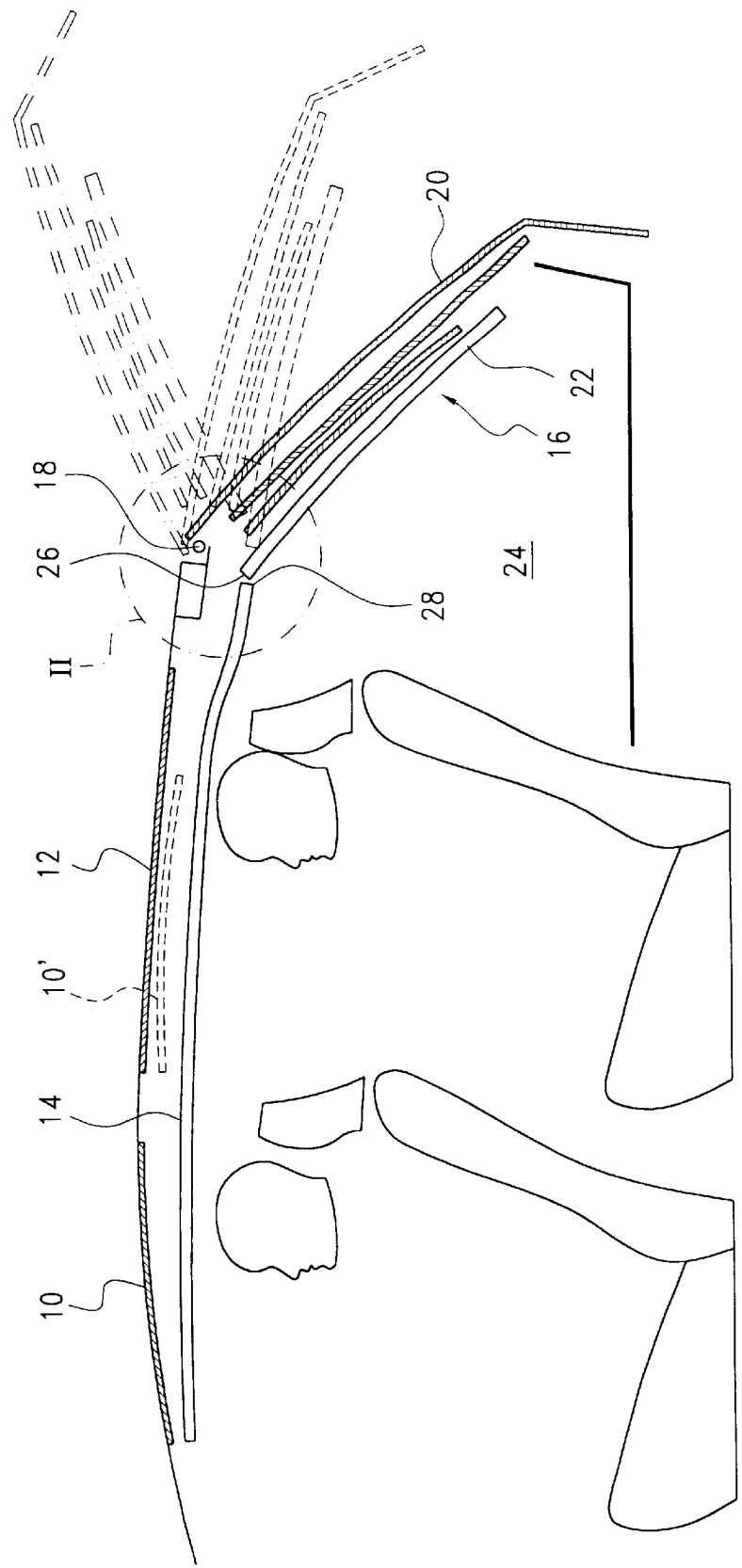
FIG. 1 is a schematic side view of the roof and back area of a motor vehicle with a a first embodiment of the motor vehicle roof in accordance with the invention, the rear gate with the covers contained being shown in three different positions.

FIG. 1 schematically shows an openable motor vehicle roof which comprises two covers 10, 12 which are located in succession in the lengthwise direction of the motor vehicle in the closed position shown in which they close a common or two separate roof openings. The two covers 10, 12 are guided on each side on a respective guideway in a laterally mounted guide rail 14 to move in the lengthwise direction of the roof. The rails 14 can, for example, be installed in a body-mounted frame or can be joined to one another with crosspieces. Alternatively, the guide rails 14 can also be made to be lowered, in order to lower the covers 10, 12 down out of the closed position.

Figure 8:
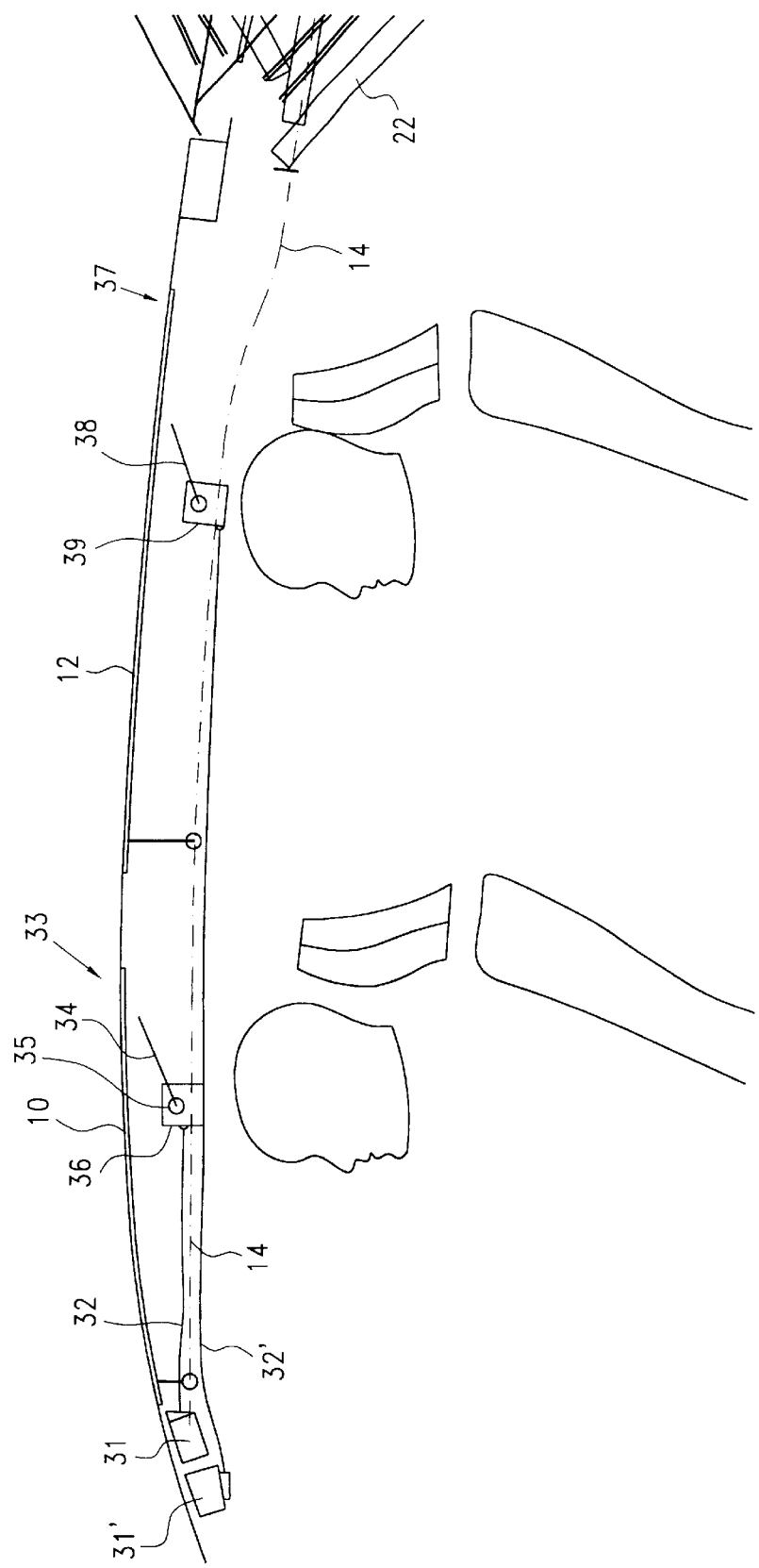
FIG. 8 is a side view as shown in FIG. 1 showing the support and the drive for the two covers.

The front cover 10 can be moved to the rear out of the closed position by means of a drive which comprises a drive motor 31 and a drive cable 32 (see FIG. 8) to under the rear cover 12 (this rearwardly displaced cover position is shown in FIG. 1 with a broken line and with reference number 10'). For this purpose, first the rear edge 33 of the front cover 10 is lowered, then the rearward displacement motion is commenced; this operation can take place, for example, by means of a respective lever element 34; a guide part 35 of a sliding carriage 36 which is movably supported on the guide rail 14 and connected to the drive cable 32 acting on the cover-mounted lever element 34.

The rear cover 12 can be lowered in a manner similar to the front cover 10, beginning with its rear edge 37, for example by means of crank elements 38 and the respective assigned sliding carriage 39 and can be pushed to the rear along the guide rail 14. In doing so the front cover 10 which has been pushed under the rear cover 12 and the rear cover 12 form a cover package which is jointly moved and optionally lowered. As already indicated, lowering can also take place by the guide rail 14 being lowered in its entirety.

On the back end of the motor vehicle roof there is a rear gate 16 which can be swung up, raising its lower end, out of the closed position about a pivot axis 18 which runs transversely to the lengthwise direction of the motor vehicle and which is located on or near the upper end of the rear gate 16. The rear gate 16 comprises an outside cover 20 and a respective lateral guide rail 22 at each side, the guide rails forming a guideway for the covers 10, 12 as a cover package. The rear gate 16 is shown in FIG. 1 in three different positions with the cover package accommodated in the rear gate 16, specifically in the closed position in which the rear gate 16 closes the rear area of the motor vehicle, in a roughly horizonal transfer position in which the covers 10, 12 can be pushed into the rear gate 16 and out of it, and in an open position in which the rear gate 16 points up at its free end in order to enable loading of the rear stowage space 24 of the motor vehicle.

In order to be able to accommodate the covers 10, 12 for clearance of the roof opening, the rear gate 16 is moved out of the closed position into the transfer position in which the covers 10, 12 are pushed as a cover package into the rear gate 16 and are deposited in it. Afterwards, the rear gate 16 can be closed again or moved into the open position for loading and unloading the stowage space 24. Actuation of the rear gate 16 can take place manually or by means of a drive, in the former case intermediate locking of the rear gate 16 being possible in the transfer position.

The displacement or adjustment of the covers 10, 12 can take place in the conventional manner by means of compressively-stiff drive cables 32, 32' which are driven by one or two electric motors 31, 31'. Here, for each cover 10, 12, there can be its own electric motor or a common electric motor. The drive cables 32, 32' are preferably made such that they can be interrupted by means of a coupling, when the covers 10, 12 are in the rear gate 16. One such coupling with two coupling parts 47, 48 is shown, for example, in FIG. 4. The electric motor or electric motors for driving the covers is or are preferably mounted on the body-mounted frame for the guide rails 14.

The guide rail 22 of the rear gate 16 in the embodiment as shown in FIGS. 1 to 4 is made stationary with respect to the rear gate 16. Since the upper end of the guide rail 22 generally does not coincide with the pivot axis 18 of the rear gate 16, in this embodiment, a gap 30 generally forms between the upper end 26 of the guide rail 22 of the rear gate 16 and the back end 28 of the body-mounted guide rail 14 in the transfer position of the rear gate 16 (see FIG. 3).

Figure 2:
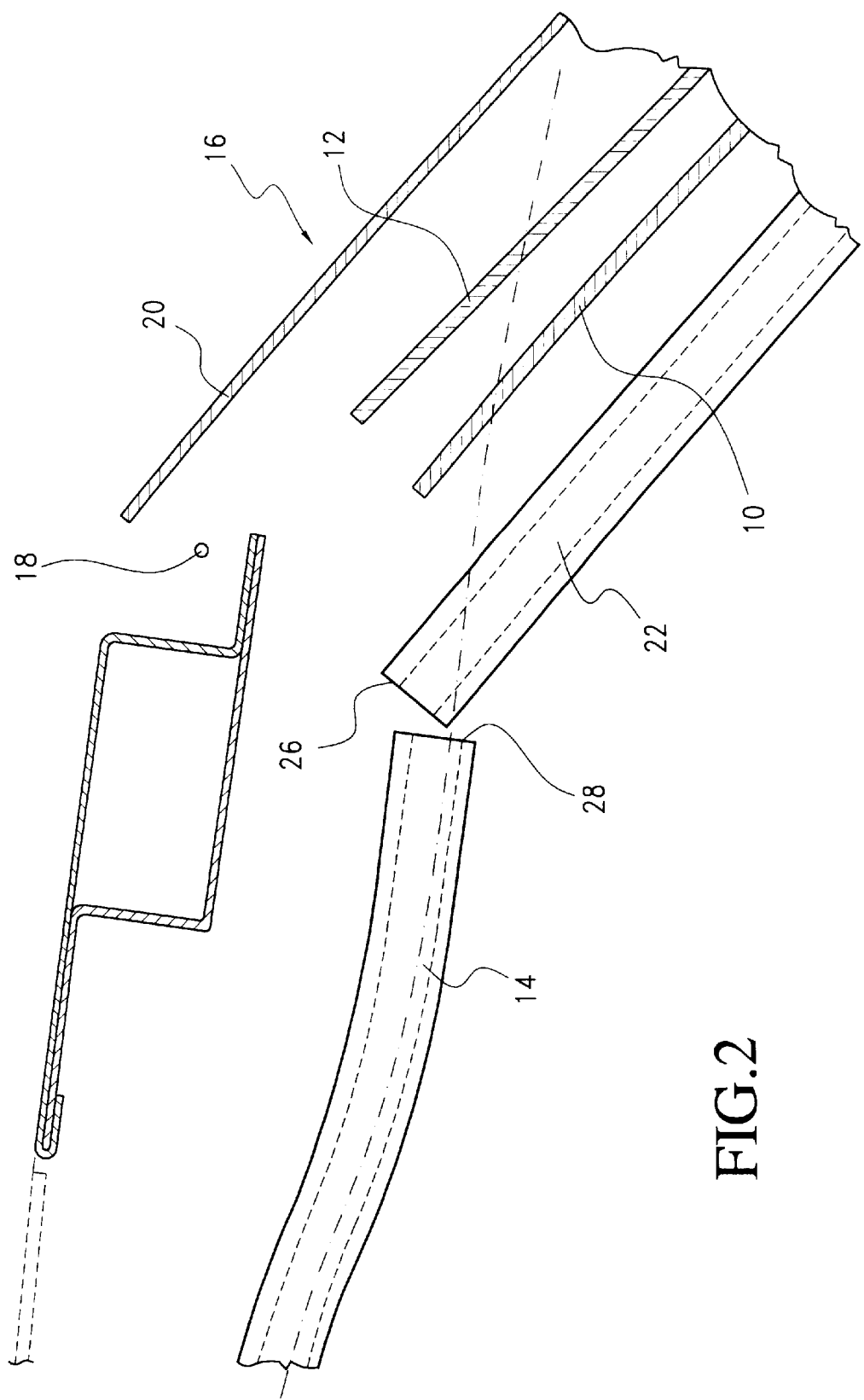
FIG. 2 shows an enlarged representation of the transfer area to the rear gate from FIG. 1, the rear gate being shown in the closed position.
Figure 3:
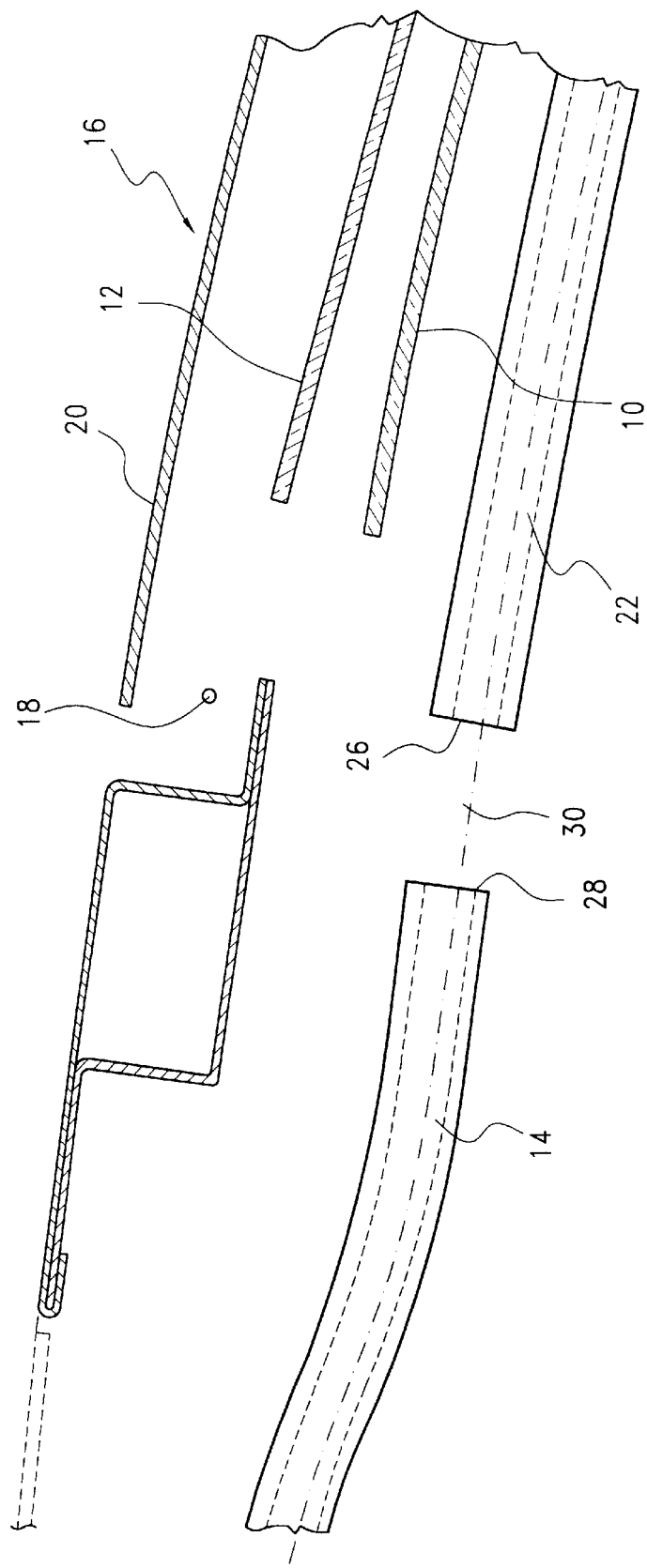
FIG. 3 shows a view like FIG. 2, the rear gate being shown in the transfer position.
Figure 4:
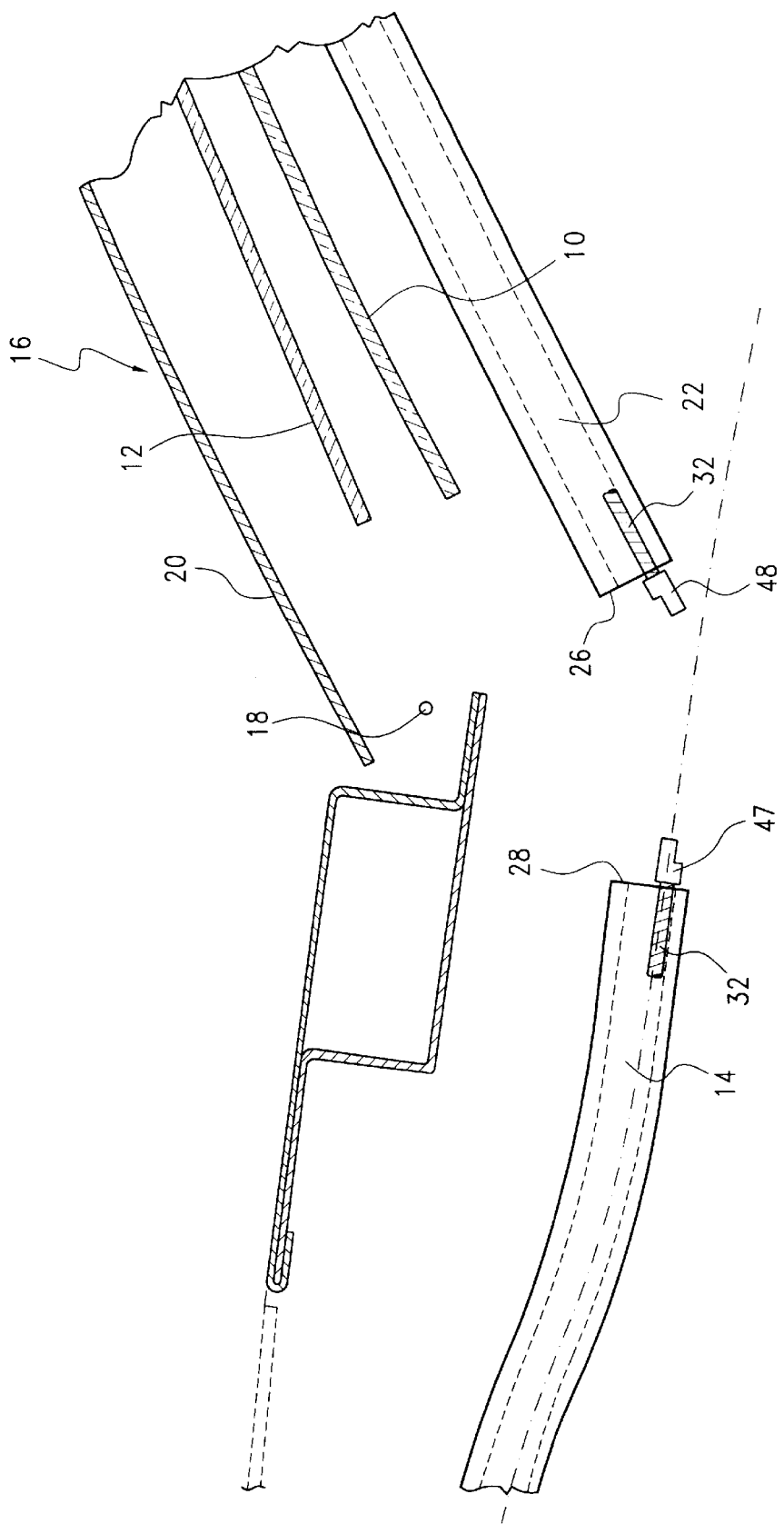
FIG. 4 shows a view like FIG. 2, the rear gate being shown in the open position.

FIGS. 2 to 4 show the transfer area (surrounded with a circle II in FIG. 1) between the motor vehicle roof and the rear gate 16, enlarged and the closed position (FIG. 2), the transfer position (FIG. 3) and the open position of the rear gate 16 (FIG. 4).

Figure 9:
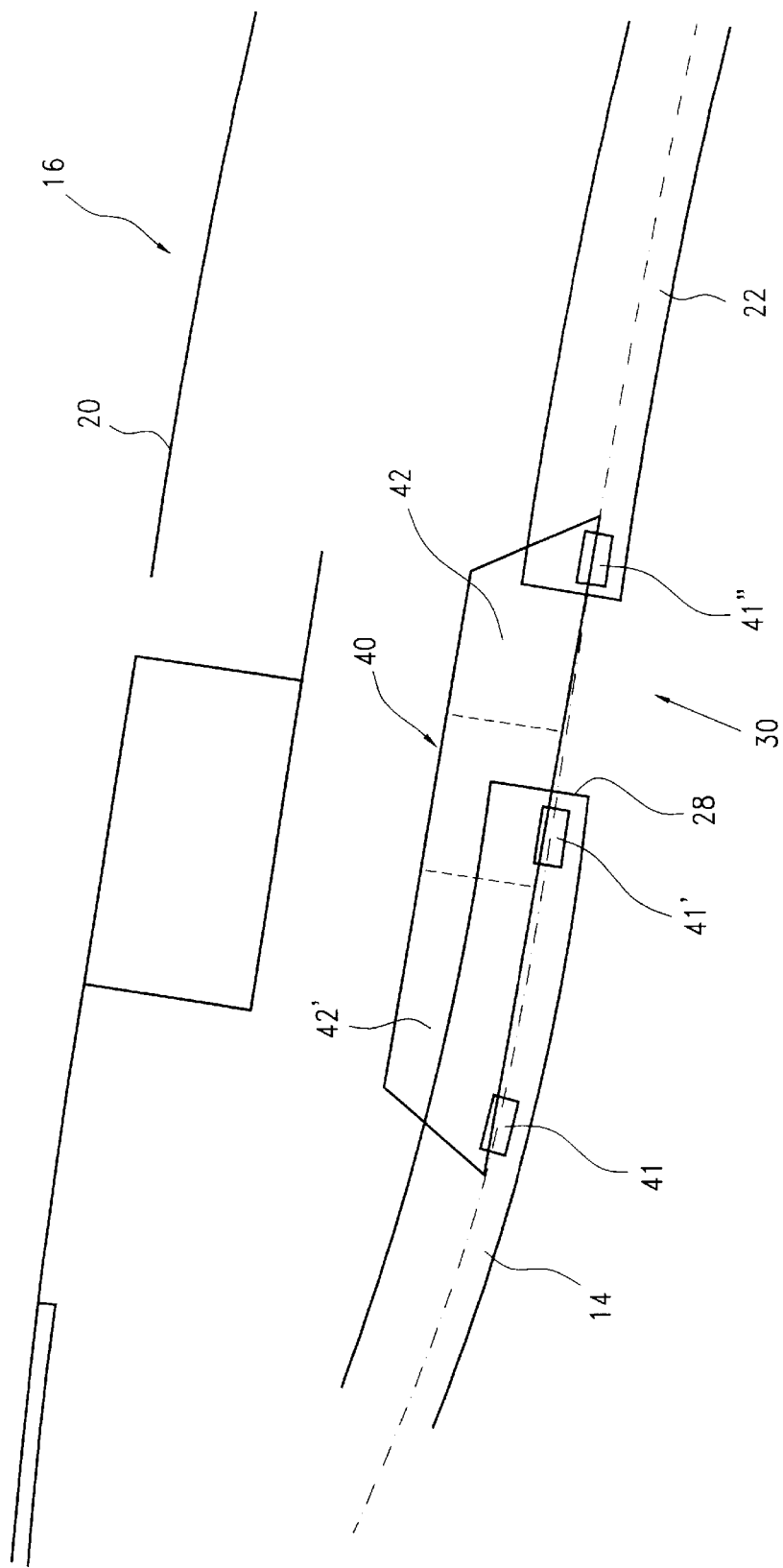
FIG. 9 is an enlarged side view of a sliding carriage in the transfer position of the rear gate.

In the transfer position shown in FIG. 3, it is necessary to bridge the gap 30 between the back end 28 of the guide rail 14 and the upper end 26 of the guide rail 22. This can take be achieved using a sliding carriage 40 that is supported on the guide rail and has three sliders 41, 41', and 41" (FIG. 9). In the position of the sliding carriage 40 which is shown in FIG. 9 and in which it bridges the gap 30, two sliders 41 and 41' still guide the sliding carriage 40 on the guide rail 14, while the third slider 41", which is located on the rear section of the sliding carriage 40, i.e., the rear bracket 42, is supported on the guide rail 22. As the sliding carriage 40 continues to move, the middle slider 41' reaches the guide rail 24 so that the sliding carriage 40 is securely supported on the guide rail 24 by double support by means of the sliders 41', 41", while first the front slider 41, which is located on the front section of the sliding carriage 40, i.e., the front bracket 42', is supported on the guide rail 14.

Alternatively, the slide elements, by means of which the covers 10, 12 are guided in the guide rail, can be dimensioned such that they can slide over the gap 30 in the guide rail 22 of the rear gate 16.

Figure 5:
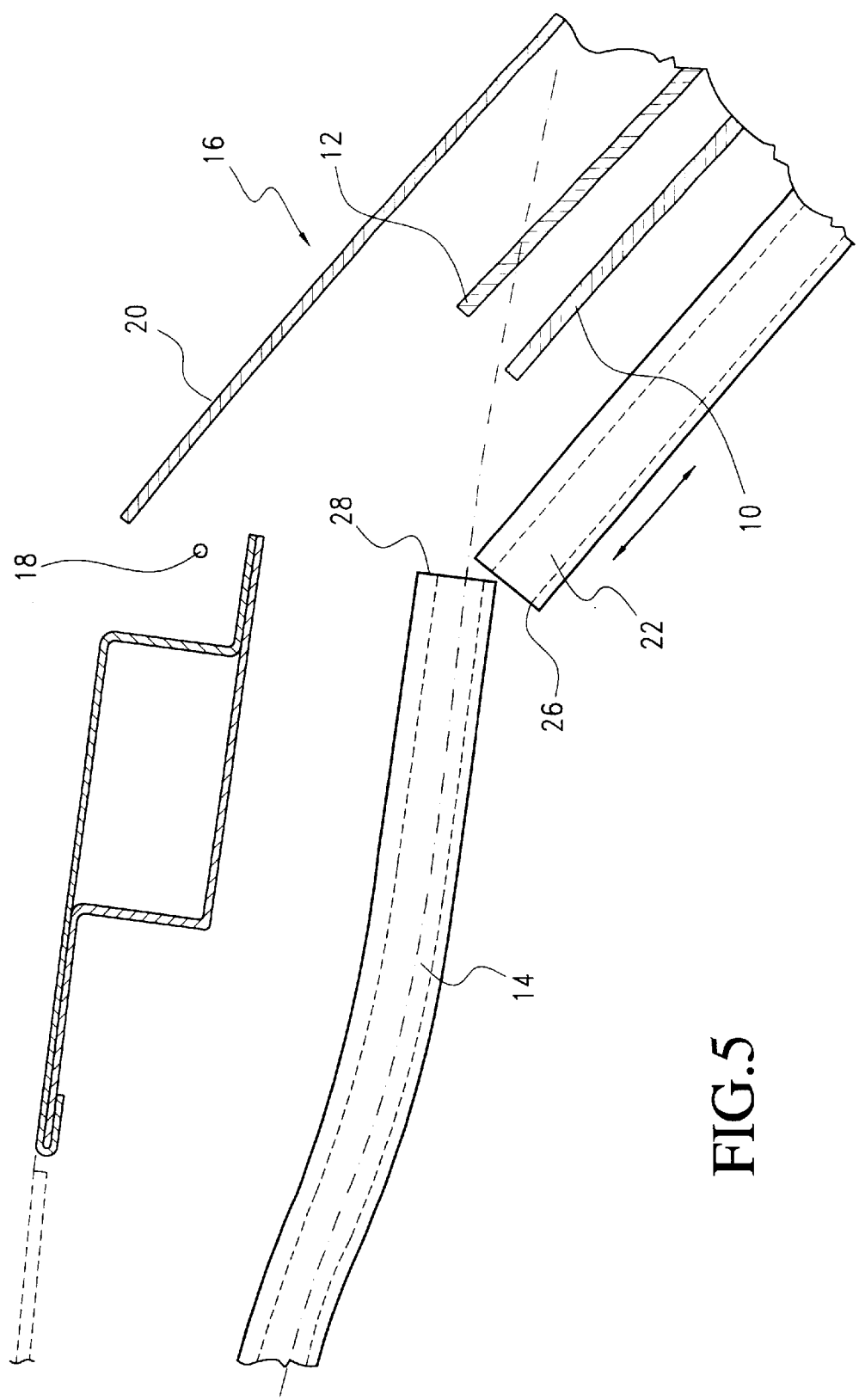
FIGS. 5 to 7 show views corresponding to FIGS. 2 to 4, but of a modified embodiment of the rear gate being shown.
Figure 6:
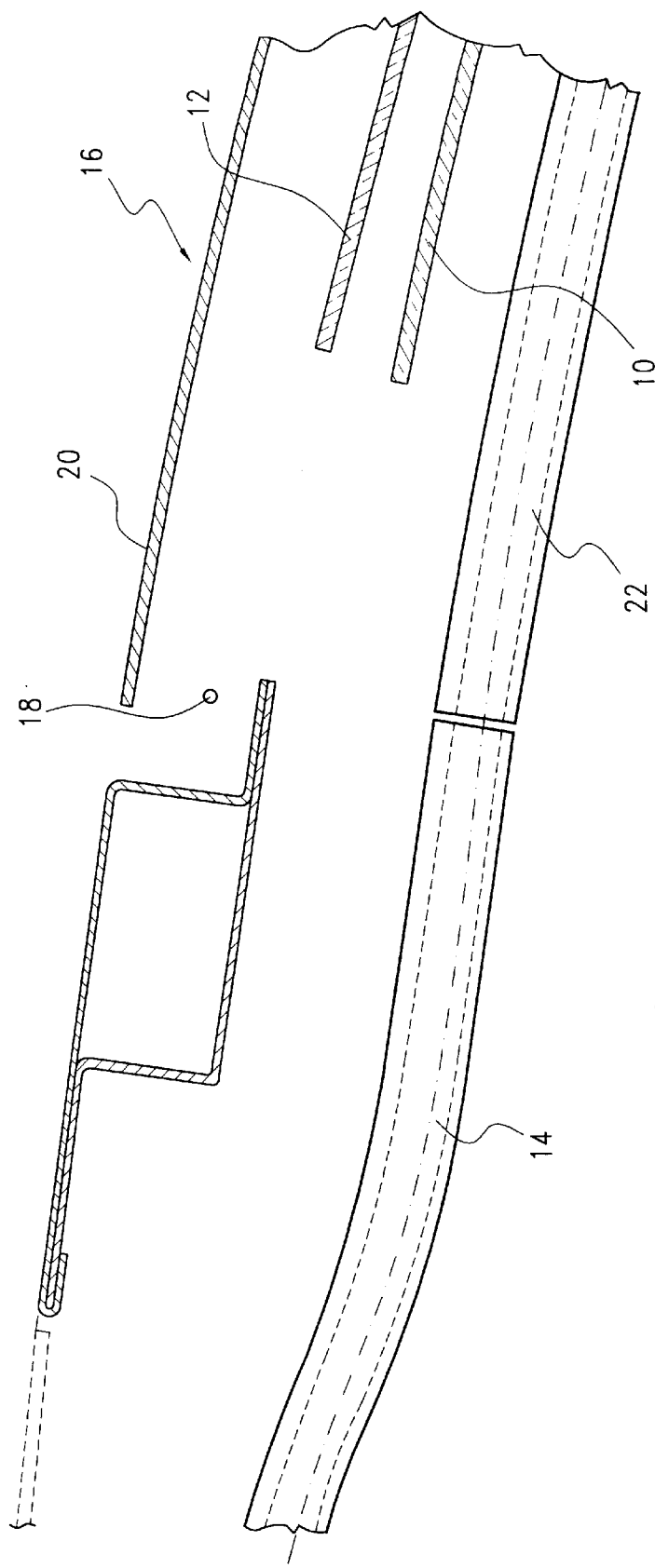
Figure 7:
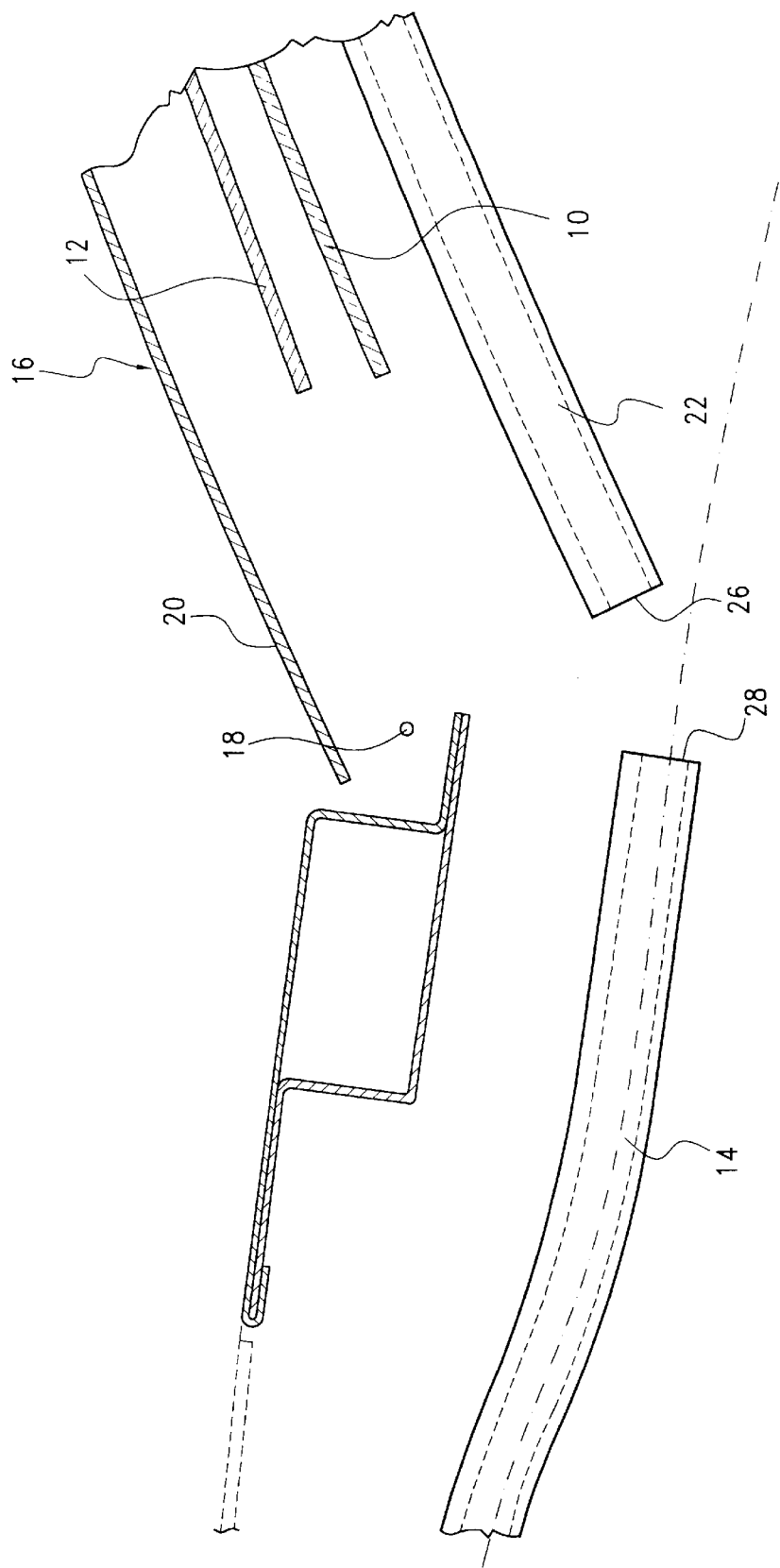

In an alternative embodiment, the problem of a gap which occurs due to the pivoting geometry between the guide rails 14, 22 can be solved (see, FIGS. 5 to 7) by the guide rail 22 of the rear gate 16 being made movable with respect to the rear gate 16 in the lengthwise direction, i.e., in the displacement direction of the covers 10, 12, as is indicated in FIG. 5 with a double arrow. Driving of the movable guide rail 22 of the rear gate 16 can take place, for example, by means of a spring which pretensions the movable guide rail 22 in the direction of the guide rail 14, or by means of a lever mechanism which is controlled by the pivoting motion of the rear gate 16 in order to move the end 26 of the movable guide rail 22 in the transfer position of the rear gate 16 against the back end 28 of the guide rail 14.

Furthermore, the movable guide rail 22 can be made such that it is centered with respect to the guide rail 14 in the transfer position of the rear gate 16 by a corresponding mechanism in order to achieve an exactly flush alignment of the guide rails 14, 22 in this position.

Figure 10:
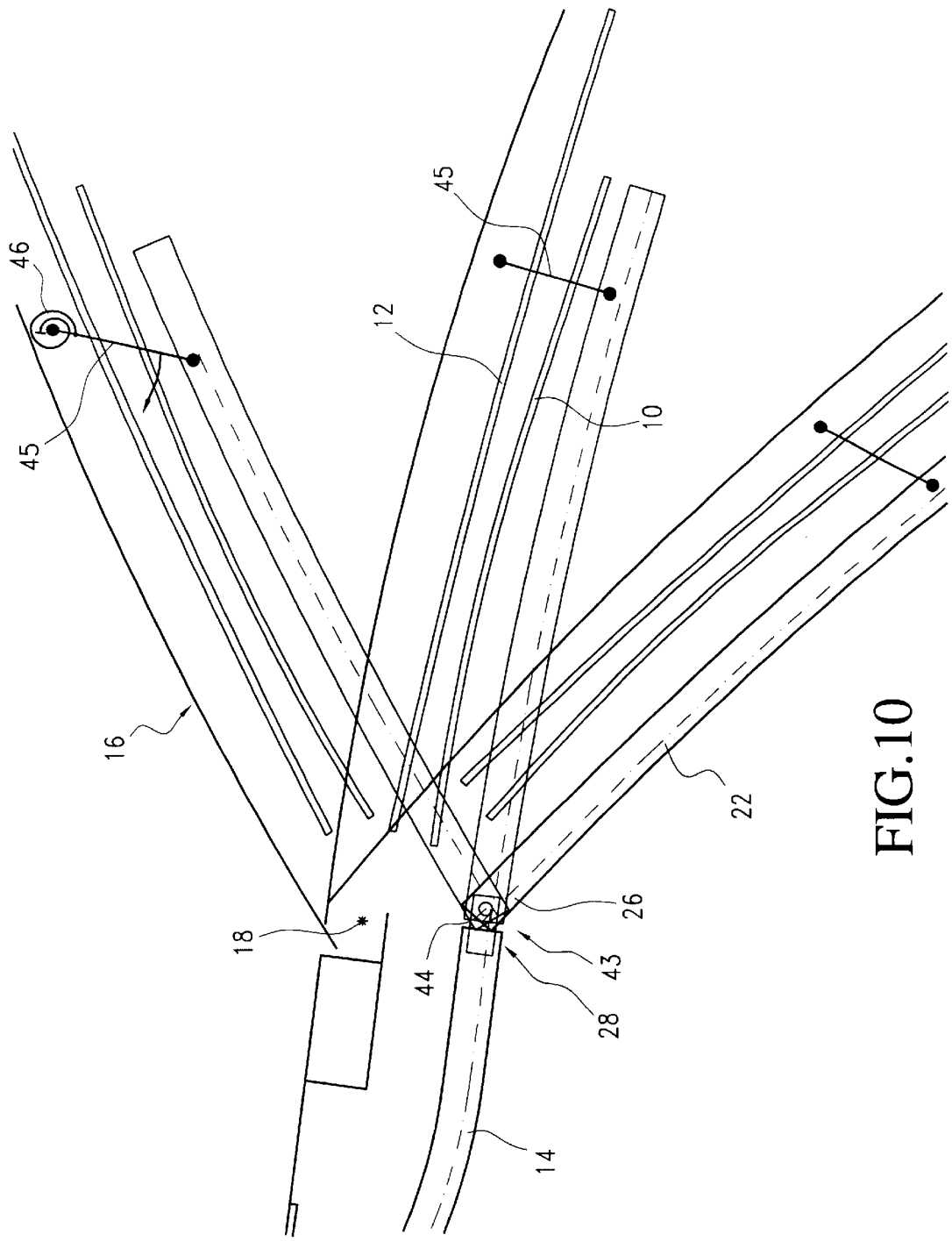
FIG. 10 is a side view of the transition area to the rear gate, the guide rail of the rear gate being supported via a joint on the guide rail of the motor vehicle roof.
Figure 11:
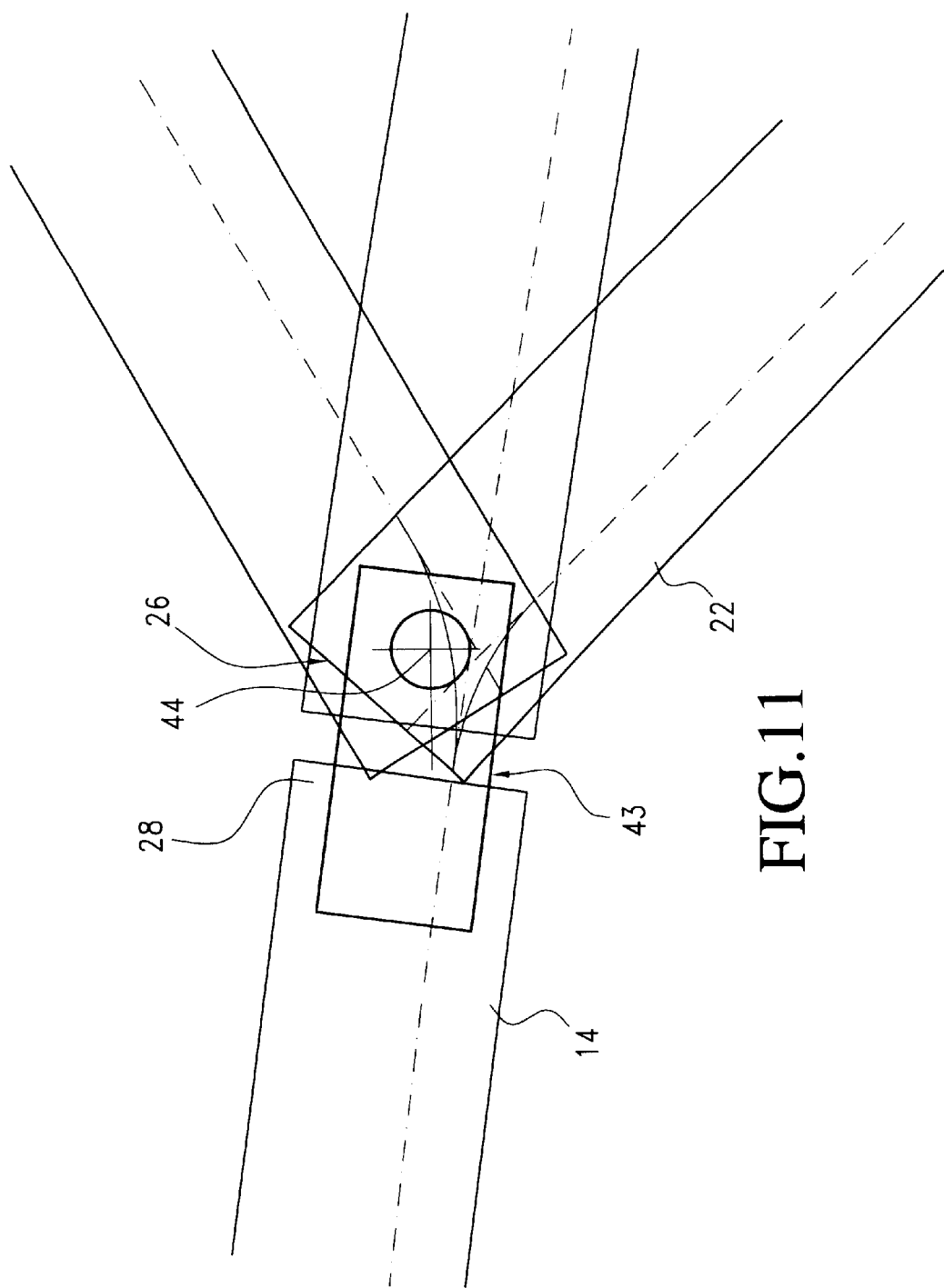
FIG. 11 is an enlarged representation of the joint from FIG. 10.

FIGS. 10 & 11 show a joint 43 which holds the front end 26 of the guide rails 22 of the rear gate 16 directly on the back end 28 of the guide rail 14 when the rear gate 16 is swung around the fixed pivot axis 44. To equalize the displacement of the guide rail 22 relative to the rear gate 16 due to the different pivot axes 44, 18, there is a lever mechanism with at least one pivot lever 45 (FIG. 10 shows the three positions of the rear gate 16 corresponding to those shown in FIG. 1) which movably joins the guide rail 22 to the rear gate 16 and enables the equalization motion.

The pivot lever 45 can also be part of a lever mechanism which moves the guide rail 22 against the back end 28 of the front guide rail 14 when the rear gate 16 is swung with support of the guide rail 22 without this joint 43, for example, by supporting a spring 46, for example, a rotary spring (see the sample representation in the top position of the rear gate 16 in FIG. 10) which pretensions the pivot lever 45 in the corresponding direction (see arrow).

The guide rails 14, 22 are preferably formed from extruded aluminum sheeting in all embodiments.

This invention makes it possible to use a simple mechanism to deposit even large covers in an area of the motor vehicle in which the lowered covers do not have an adverse visual appearance or reduce the size of the stowage space.

What is claimed is:

1. Openable motor vehicle roof arrangement, comprising:
  a fixed vehicle roof having at least one roof opening formed therein;
  a roof guideway mounted extending along the fixed vehicle roof in a front to rear direction;
  an openable rear gate having an upper end area thereof pivotably mounted at a rear end of the fixed vehicle roof so as to be swingable relative thereto between a closed gate position and an open gate position;
  at least one cover which is movable from a closed cover position in which it closes the roof opening in the fixed vehicle roof, rearward along said roof guideway into a deposited position in the rear gate;
  wherein the rear gate has a guideway for the at least one cover; wherein the guideways of the fixed vehicle roof and the rear gate are adapted to enable transfer of the at least one cover from guideway of the fixed vehicle roof to the guideway of the rear gate when the rear gate is in a transfer position which lies between the closed gate position and the open gate position.

2. Motor vehicle roof arrangement as claimed in claim 1, wherein the rear gate is roughly horizontal in the transfer position.

3. Motor vehicle roof arrangement as claimed in claim 1, wherein the guideway of the rear gate is stationary with respect to the rear gate.

4. Motor vehicle roof arrangement as claimed in claim 3, wherein a gap exists between a front end of the guideway of the rear gate and a back end of the guideway of the fixed vehicle roof in the transfer position of the rear gate; and wherein a carriage with brackets is guided in at least one the guideways for bridging said gap.

5. Motor vehicle roof arrangement as claimed in claim 1, wherein the guideway of the rear gate is movable with respect to the rear gate in a lengthwise direction thereof to adjoin an upper end thereof with a back end of the guideway of fixed vehicle roof in the transfer position of the rear gate.

6. Motor vehicle roof arrangement as claimed in claim 5, wherein the guideway of the rear gate is spring tensioned in a direction toward the back end of the roof guideway.

7. Motor vehicle roof arrangement as claimed in claim 5, further comprising a lever mechanism which controlled by swinging motion of the rear gate, and which is adapted to move the guideway of the rear gate in said lengthwise direction thereof to adjoin an upper end thereof with a back end of the guideway of fixed vehicle roof in the transfer position of the rear gate.

8. Motor vehicle roof arrangement as claimed in claim 5, further comprising a centering mechanism for centering the guideway of the rear gate with respect to the guideway of the fixed vehicle roof.

9. Motor vehicle roof arrangement as claimed in claim 1, wherein said at least one cover comprises a front cover and a rear cover which are located in succession in the closed roof position, the front cover being movable in the guideway of the fixed vehicle roof to under the rear cover to form a cover package which is movable into the rear gate.

10. Motor vehicle roof arrangement as claimed in claim 9, wherein the front cover and the rear cover are guided on the same fixed vehicle roof guideway.

11. Motor vehicle roof arrangement as claimed in claim 9, wherein guide levers are provided for lowering the front and the rear covers.

12. Motor vehicle roof arrangement as claimed in claim 9, wherein compressively-stiff drive cables which are driven by at least one drive motor that is mounted in a fixed position are provided for displacing the covers along the guideways; and wherein a coupling is provided for disengaging the drive cables to enable the rear gate with the covers to swing away from the drive cables into the closed gate position.

13. Motor vehicle roof arrangement as claimed in claim 9, wherein a separate drive motor is provided for driving each cover.

14. Motor vehicle roof arrangement as claimed in claim 1, wherein the guideways comprise rails.

15. Motor vehicle roof arrangement as claimed in claim 12, wherein said rails are formed of extruded aluminum sheeting.

16. Motor vehicle roof arrangement as claimed in claim 1, wherein the fixed vehicle roof guideway is mounted on a vehicle body portion.

* * * * *